(12) United States Patent
Krishnamurthy et al.

(10) Patent No.: US 10,423,340 B1
(45) Date of Patent: Sep. 24, 2019

(54) METHOD TO REPAIR THE LOCALITY OF THE NAMESPACE ON DEDUPLICATION STORAGE FILE SYSTEM

(71) Applicant: EMC Corporation, Hopkinton, MA (US)

(72) Inventors: Ajith Krishnamurthy, Bangalore (IN); Dheer Moghe, Bangalore (IN); George Mathew, Belmont, CA (US); Prajakta Ayachit, Pune (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 277 days.

(21) Appl. No.: 15/084,915

(22) Filed: Mar. 30, 2016

(51) Int. Cl.
*G06F 3/06* (2006.01)

(52) U.S. Cl.
CPC .......... *G06F 3/0619* (2013.01); *G06F 3/0647* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 2011/0252217 A1* | 10/2011 | Lillibridge | ............ | G06F 3/0608 711/173 |
| 2011/0320606 A1* | 12/2011 | Madduri | ............... | G06F 9/5005 709/226 |
| 2015/0095596 A1* | 4/2015 | Yang | ........................ | G06F 3/061 711/162 |

* cited by examiner

*Primary Examiner* — Ann J Lo
*Assistant Examiner* — Leandro R Villanueva
(74) *Attorney, Agent, or Firm* — Womble Bond Dickinson (US) LLP

(57) ABSTRACT

Embodiments are described for repairing the locality of a namespace index on a deduplication storage device. A namespace index is selected from a plurality of namespace indices, each of which is mountable on the storage system. The selected namespace index is traversed and divided into regions, each of which was stored in one or more storage containers. Locality information for each region is generated, including a density metric and a distribution metric. If either metric is below a threshold value for the metric, then the region is enqueued for namespace locality repair. A region can be repaired by reading the region into memory and flushing the memory to co-located containers on the storage system.

15 Claims, 8 Drawing Sheets

METHOD TO REPAIR THE LOCALITY OF THE NAMESPACE ON DEDUPLICATION STORAGE FILE SYSTEM

TECHNICAL FIELD

This disclosure relates to the field of defragmenting a namespace of a storage system. More specifically, the disclosure relates to defragmenting a namespace of a storage having a plurality of mountable namespaces in a deduplication storage file system.

BACKGROUND

A deduplicating storage file system ("storage appliance") can support hundreds of mountable file system namespaces. Each namespace requires resources, such as volatile and non-volatile memory (NVRAM) to implement the namespace. A namespace can be implemented in an indexed structure such as a binary tree, a B–tree or a B+tree. A namespace often has an initial resource allocation that may be contiguous, that soon becomes fragmented as memory pages or disk sectors are added to, or deleted from, the namespace. Namespace fragmentation is distinct from fragmentation of the files that are referenced by the namespace.

A namespace, or a portion thereof, will be periodically written to storage to protect against corruption of the namespace due to a failure of the storage appliance, such as a power loss or disk failure. To efficiently store changes to numerous namespaces, the namespaces may be multiplexed before storing the namespace changes to storage containers. A container is a structure that is written once, and not modified thereafter. Thus, as each namespace becomes fragmented, and is written to storage, then each container may hold a plurality of namespaces each of which may be fragmented, further increasing the fragmentation of each namespace.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
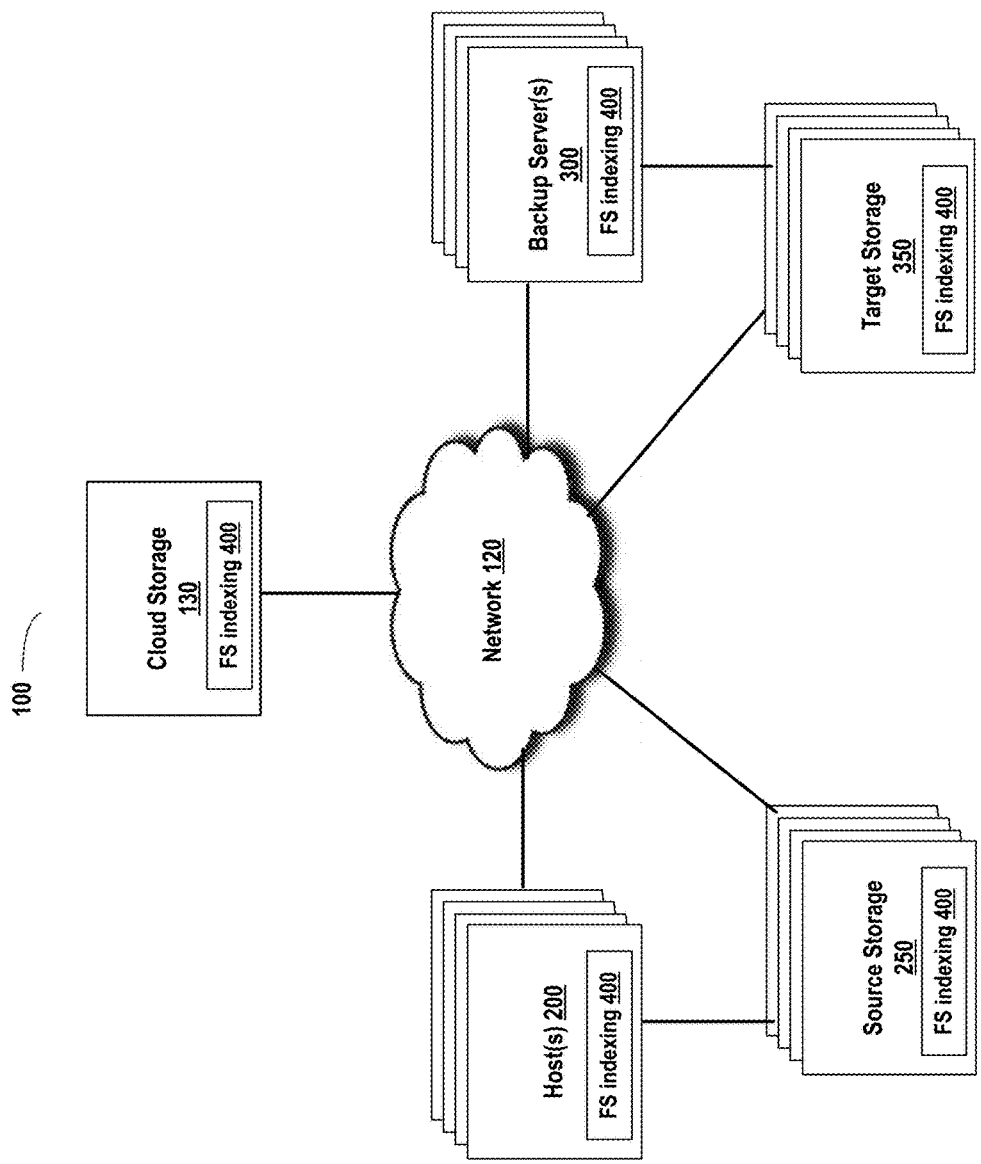
FIG. 1 illustrates, in block diagram form, an overview of an computing infrastructure that can repair the locality of a namespace on a deduplication storage file system in accordance with some embodiments.

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for repairing the locality of a namespace on a deduplication storage file system (DDFS). Each namespace in a plurality of mountable namespaces on the DDFS can comprise an index to files named in the namespace. In an embodiment, the index is stored as a B+Tree. In an embodiment, each namespace index is termed a "managed tree" or "MTree." Each index can contain one or more regions that may have fragmentation. Each region may be stored in one or more storage containers on the DDFS. Fragmentation of a region of a namespace can include density that is less than a threshold value or distribution that is less than a threshold value. Density of a region can be determined by finding the optimal number of containers in which to store the region, divided by the actual number of unique containers that are used to store the region. A container may have more than one storage page that represents a portion of the namespace index. Namespace index pages stored in the same container may not represent contiguous portions of the same region of the namespace. Thus, when traversing the namespace index in logical order ("enumerating the MTree"), the same container may be read more than once. This is termed the distribution of the regions with respect to containers of storage. Distribution can be determined by the optimal number of containers needed to store the region of the namespace index divided by the number of containers read when enumerating the region. Regions with poor distribution or density have poor locality and may need to be enqueued for locality repair. Locality repair can comprise enumerating a bad region of the namespace, thereby bringing the region of the namespace into memory, then marking the memory pages containing the region of the namespace index as dirty and flushing the memory pages to one or more containers. In an embodiment, the page flush co-locates the flushed memory pages such that the memory pages that represent an enumerating order of the region of the MTree are stored in the same container, sequential containers, or containers that are physically near to each other on a storage device. Containers are physically near to one another if they are on the same stripe of a raid array, the same cylinder of a disk, or a cylinder that is within a threshold number of cylinders away from a first storage container of the region. In an embodiment, pages are marked as "no deduplication" when flushed to storage.

Any of the above methods can be embodied on a non-transitory computer-readable medium programmed with executable instructions that, when executed, perform the method. A system can be programmed with executable instructions that, when executed by a processing system that includes at least one hardware processor, can perform any of the above methods.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

FIG. 1 illustrates, in block diagram form, an overview 100 of a computing infrastructure that can repair the locality of a namespace on a deduplication storage file system in accordance with some embodiments.

Namespace locality repair can implemented for one or more namespaces of any file system. In a computing infrastructure 100, a file system can be implemented in one or more hosts 200, source storages 250, target storages 350, backup servers 300, and cloud storage 130, interconnected via network 120.

Host(s) 200 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of host(s) 200 may be a primary storage system (e.g., local data center) that provides storage to other local clients, which may periodically back up the content stored therein to a backup storage system (e.g., a disaster recovery site or system), such as backup system 300. Network 120 may be any type of network such as a local area network (LAN), a wide area network (WAN) such as the Internet, a fiber network, a storage network, or a combination thereof, wired or wireless.

Host 200 can backup or restore one or more virtual disks of a virtual machine on the host 200 to or from the backup server 300. Backup server 300 can, in turn, opt to store all or a portion of the backup data of the one or more applications to cloud storage 130 or to target storage(s) 350. The virtual disks can map to one or more physical disk drives. The one or more physical disk drives can be located within host 200. In an embodiment, a virtual disk can map to a network attached storage (NAS) across network 120 such as source storage 250 ("storage appliance"). A storage appliance 250 can comprise a large number of disks, such as EMC® VMAX 400K with up to 5,760 hard drives. In an embodiment, one or more storage appliances 250 can form a part of a host 200. In an embodiment, a virtual disk can be a raw virtual disk mapped to a one or more portions of storage. A portion of storage can comprise one or more logical unit numbers (LUNs) of a single physical disk or one or more physical disks in a storage appliance 250. In an embodiment, a raw disk can be configured to use virtual mapping to one or portions of storage, such that the portions of storage can be snapshot before a backup. In an embodiment, a raw virtual disk can be physically mapped to one or more portions of storage.

A backup of a virtual disk on a virtual machine on host 200 can be initiated by a user of the virtual machine on host 200. In an embodiment, a remote administrator 110 can initiate a backup or restore of a virtual disk of a virtual machine on host 200. In an embodiment, scheduled backups can be initiated by backup server 300. Backup server 300 can initiate a backup or restore of virtual disk on a virtual machine on host 200 in accordance with one or more backup policies associated with host 200 or associated with a virtual machine on host 200.

Figure 2:
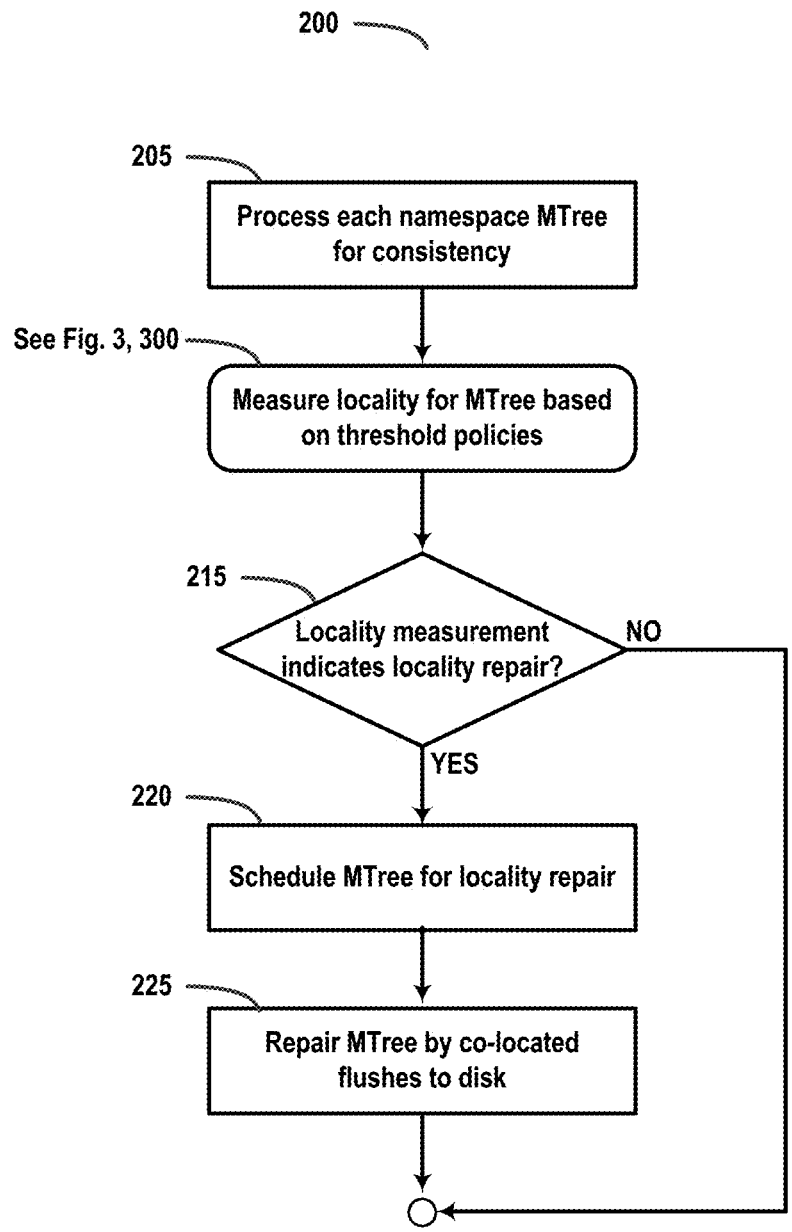
FIG. 2 illustrates, in block diagram form, an overview of a method of repairing the locality of a namespace on a deduplication storage file system, in accordance with some embodiments.

FIG. 2 illustrates, in block diagram form, an overview of a method of repairing the locality of a namespace on a deduplication storage file system, in accordance with some embodiments.

In operation 205, each MTree that stores a namespace index can be processed for consistency, which triggers an in-order traversal of the MTree ("enumerating the MTree") to determine whether the MTree needs locality repair. A namespace comprises an index that can be stored in an index data structure. In an embodiment, the index data structure can be stored as a B–Tree, a B+Tree, a binary tree, or other index structure that can be traversed in order of the keys indexed by the data structure. As used herein, the index structure of a namespace is referred to as a managed tree or "MTree."

In operation 300, the locality of the MTree for a namespace can be measured based on threshold policies. In an embodiment, locality metrics include a density and a distribution of the MTree. A namespace can be stored in multiple storage containers. An MTree can comprise multiple regions, each stored in one or more containers. Density of a region of the namespace refers to a ratio of the ideal number of containers needed to store the region of the namespace to the number of actual containers used to store the region of the namespace. Distribution of the region of the namespace refers to a ratio of the ideal number of containers needed to store the region of the namespace to the number of actual containers read in enumerating the region of the namespace.

In operation 215, it can be determined whether locality measurement of the namespace indicates that the namespace locality needs to be repaired. Locality measurement refers to all of the locality measurements of the all of the regions of the MTree of the namespace. Not all of the regions will indicate low density or bad distribution of a region across containers. The locality measurements for each of the regions can be examined to determine which region(s) need to have the locality of the region repaired. Repairing the locality of a region of an MTree of a namespace ensures that the region is stored in the minimum number of containers requiring the minimum number of container read operations to traverse the MTree of the namespace index.

If, in operation 215, the locality measurement of the MTree indicates that one or more regions of the MTree need locality repair, then in operation 220 the MTree is scheduled for locality repair, and in operation 225, locality repair of the MTree is implemented by flushing memory to co-located storage locations. The pages in memory of the MTree are adjacent when the MTree is traversed in logical order. Flushing memory pages writes one region-worth of memory pages to one container.

If the locality measurement of the MTree indicates that no regions of the MTree need locality repair, then the method 200 ends.

Figure 3:
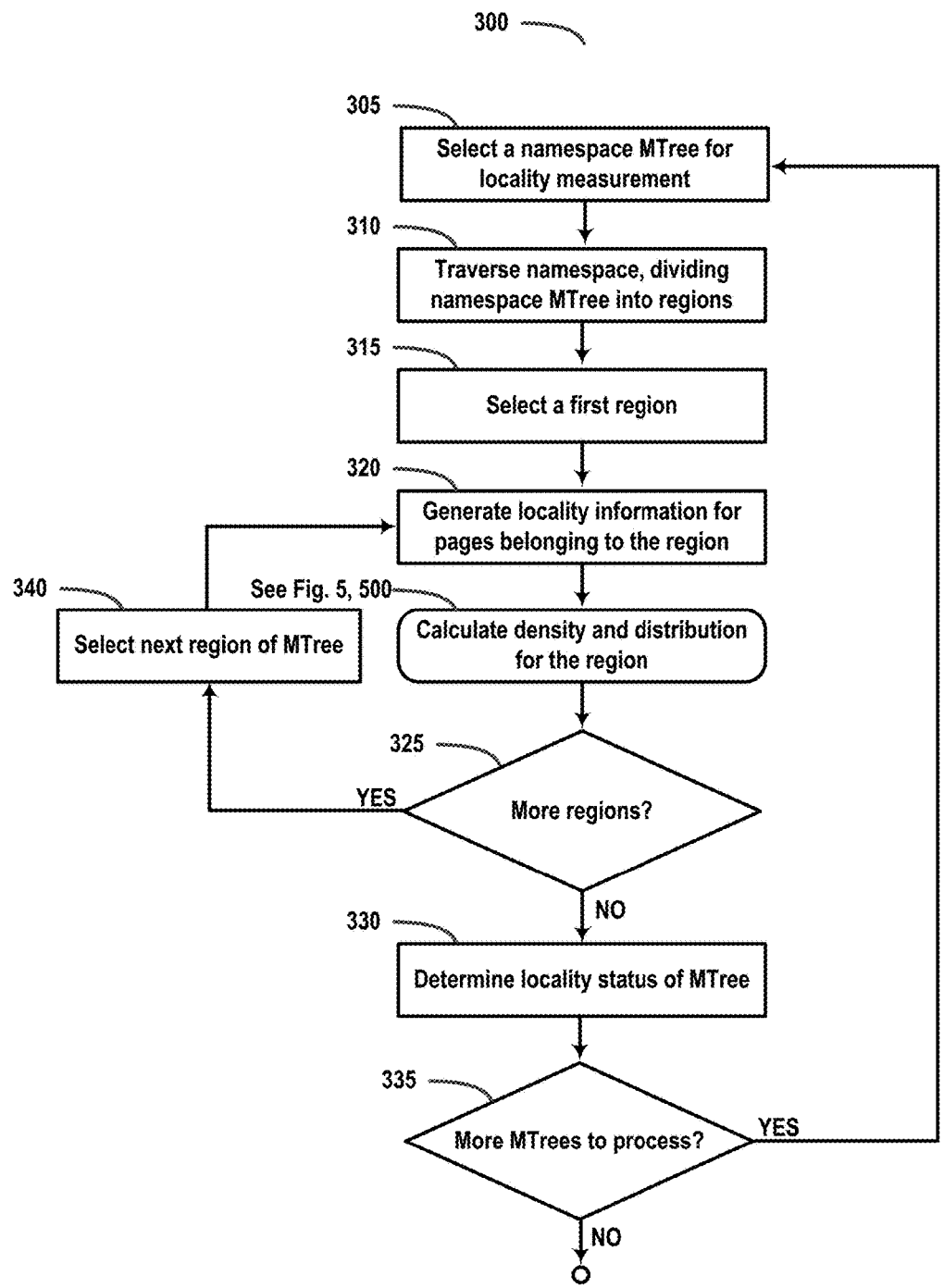
FIGS. 3 illustrates, in block diagram form, a method of measuring the locality of a namespace of a deduplication storage file system, in accordance with some embodiments.

FIG. 3 illustrates, in block diagram form, a method of measuring the locality of a namespace of a deduplication storage file system, in accordance with some embodiments.

In operation 305, an MTree of a namespace index is selected for locality measurement. A storage system may have hundreds of mountable namespace indices, each of which may be stored in an MTree that can need locality repair.

In operation 310, the MTree is traversed in order, termed "enumerating the MTree." In an embodiment, order in the MTree can be by mode number of a file or directory. In an embodiment, order can be by a textual name of a file or directory. During enumeration of the MTree, the tree can be broken down into one or more MTree regions. In an embodiment, a region can comprise a fixed number of pages. In an embodiment the number of pages in a region can be 130 pages. In an embodiment, the size of a page can be 64 kilobytes (64 KB). Other sizes for a region can be used, based upon considerations such as the size of a container of storage, a size of a raid array stripe that may be used to co-locate storage containers, a size of a cylinder of a storage device that may be used to co-locate storage containers, a size of available memory into which to read a region for locality repair.

In operation 315, a first region of the selected MTree can be selected for locality measurement. The region can be read into memory. As the region is read, the number of unique actual storage containers used to store the region can be determined. In addition, the number of actual storage containers read can be determined. The actual number of unique storage containers used to store the region and the number of storage containers read when enumerating the region can differ. For example, a particular region may be stored in three containers. The region may be stored in four portions. If portions one and four are stored in the first container, then while enumerating the MTree region, the first container will be read twice: once for the first portion of region and once for the fourth portion of the region. This is an example of poor distribution. Additional details about how low density and poor distribution can occur are discussed below with reference to FIG. 4.

In operation 500, a density and distribution for the selected region can be determined. For additional details about determining density and distribution calculations, see the description of FIG. 5, below.

In operation 325, it can be determined whether there are more regions of the MTree to enumerate and generate locality information for.

If, in operation 325, it is determined that there are more regions to process, then in operation 340, a next region of the MTree is selected and the method 300 resumes at operation 320.

If, in operation 325, it is determined that there are no more regions of the selected MTree to process, then in operation 330 a locality status of the MTree can be determined. Locality status refers to determining whether there are any regions of the MTree that need locality repair. In an embodiment, a threshold value can be set for making the determination whether the MTree needs locality repair. In an embodiment, if more than 40% of the regions of the MTree need locality repair, then those regions of the MTree needing locality repair are scheduled for locality repair, otherwise no locality repair is performed on the MTree. In an embodiment, a method of locality repair can track a number of times that the MTree has been enumerating or otherwise accessed. If the number of accesses of the MTree is below a threshold value, then the locality repair method 200 may not be used to repair the locality of the MTree because the overhead to repair the locality of the MTree is high with respect to a number of times the MTree has been used. In an embodiment, a method of locality repair 200 of a namespace may also consider a size of the MTree in determining whether to schedule any regions of an MTree for repair. If an MTree is small, and uses lower than a threshold number of containers, then the overhead to repair the locality of the MTree may be high in relation to the number of containers that may be read when the MTree is accessed. In another embodiment, a method of locality repair 200 of an MTree storing a namespace index may further consider a read/write/seek distance between containers of a region of a namespace in determining whether to perform locality repair on one or more regions of the MTree of the namespace index. For example, a region of an MTree may have poor distribution or density, but the location of the containers storing the region are all on one disk cylinder or raid array stripe, such that little or no disk head seek time is needed to access the containers of the region. Any, or all, of the above considerations can be used to determine whether to repair the locality of a namespace index stored in an MTree.

In operation 335, it can be determined whether there are more namespace MTrees to process. If so, the method 300 resumes at operation 305. Otherwise the method 300 ends.

Figure 4:
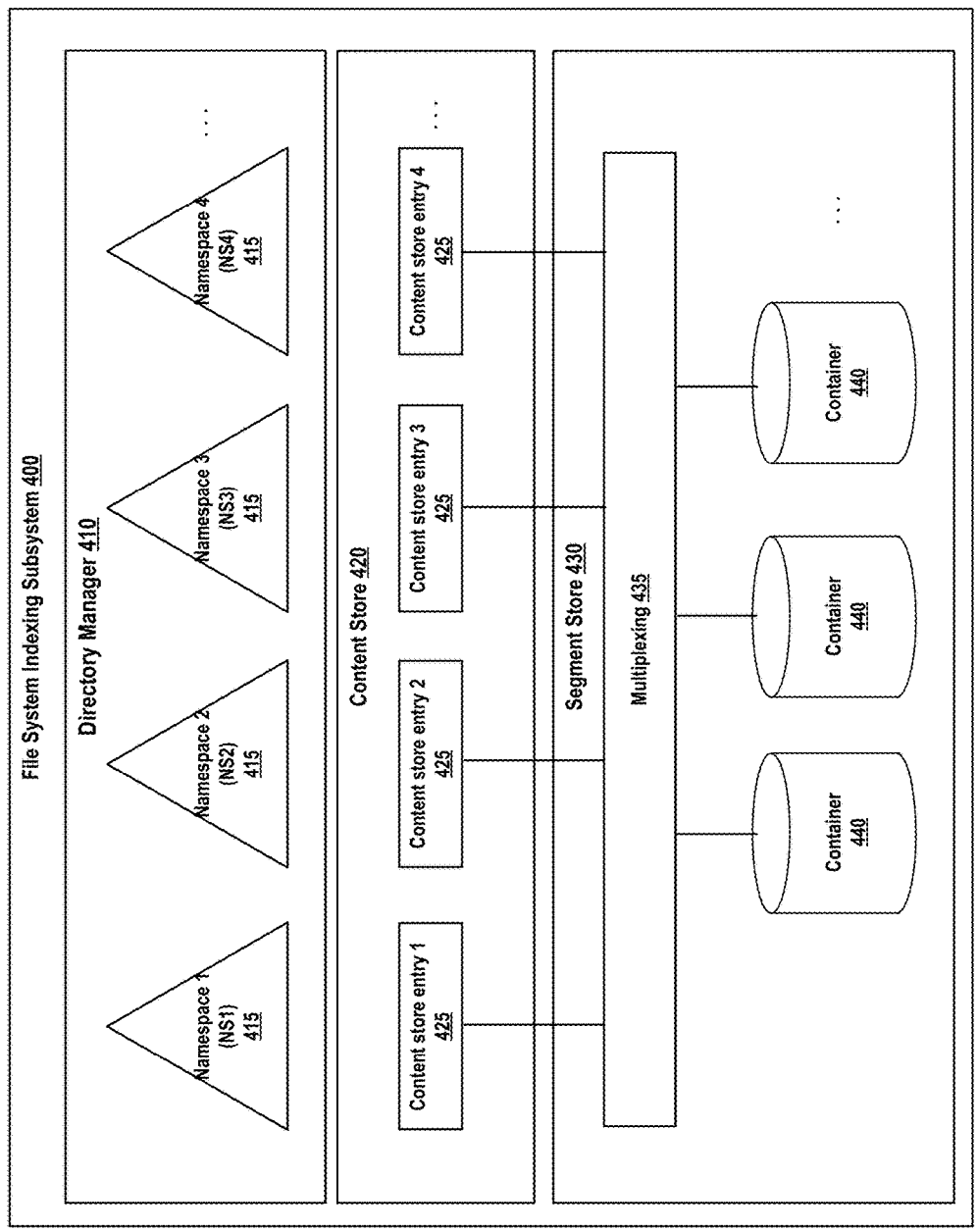
FIG. 4 illustrates, in block diagram form, components of a file system indexing subsystem that can repaired by a method of repairing the locality of a namespace on a deduplication storage file system, in accordance with some embodiments.

FIG. 4, in block diagram form, components of a file system indexing subsystem 400 that can generate fragmentation in a namespace index 415 that may need locality repair by method 200 on a deduplication storage file system, in accordance with some embodiments A file system indexing subsystem 400 can include a directory manager 410, a content store 420, and a segment store 430.

A directory manager 410 can store any number of namespace indices 415, such as namespace 1 (NS1) through namespace 4 (NS4) up to namespace n (NSn, not shown), each having its own MTree index structure to store the namespace. As a namespace index 415 grows, and new file names are added to the namespace index, the names are stored in a memory of the content store 420 of the file system and later appended to the end of the namespace index 415.

An appended portion of a namespace index 415 can be stored in a content store entry 425 of content store 420. Appending the content store entry 425, or deleting a content store entry 425 of a namespace index 415, can cause the namespace index 415 to fragment. Each of mountable namespaces 415 can grow, or shrink. To support multiple mountable namespaces 415, a system memory may multiplex 435 namespaces 415 NS1 through NSn into a container 440 of a segment store 430 of a storage system. Multiplexing 435 content store entries 425 into a container 440 can further cause fragmentation of a namespace index 415 across multiple containers 440. A method of locality measurement 300, as described with reference to FIG. 3, above, can be used to determine whether one or more regions of a namespace index 415 stored in an MTree should have the namespace locality repaired for the MTree (repair the fragmentation of the namespace index 415).

Figure 5A:
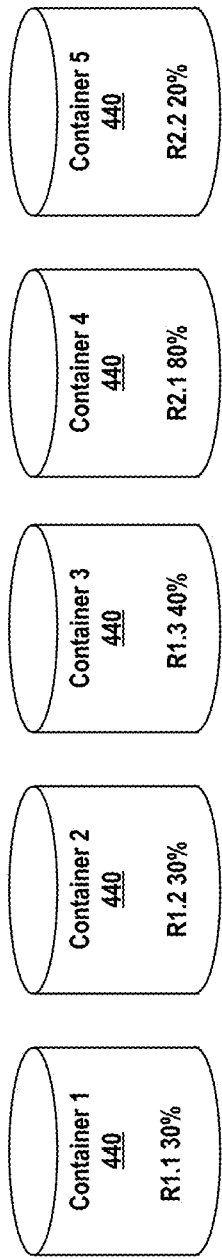
FIGS. 5A and 5B illustrate, in block diagram form, examples of locality of a namespace including density of the namespace and distribution of the namespace within storage containers on a deduplication storage file system, in accordance with some embodiments.
Figure 5B:
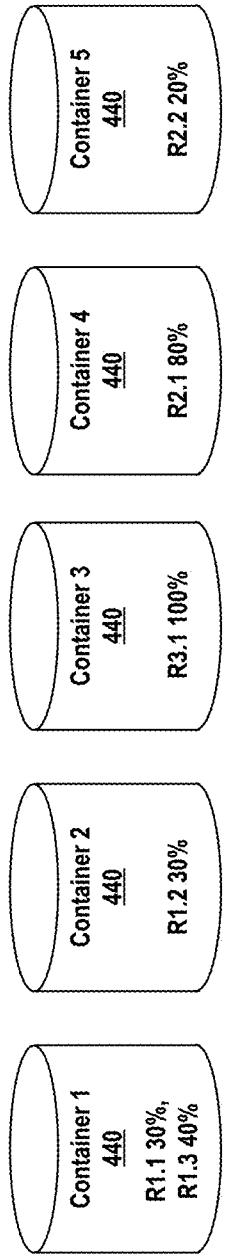

FIGS. 5A and 5B illustrates, in block diagram form, examples of locality of a namespace including density of a region of the namespace index (FIG. 5A) and distribution of a region of the namespace index (FIG. 5B) within storage containers on a deduplication storage file system, in accordance with some embodiments.

As described above, a namespace index of a file system can become fragmented and need locality repair. As also described above, multiple namespace indices 415 can be stored in a single container 440, due to the multiplexing operations 435 of the segment store 430. A locality measurement can be made with respect to at least a density and a distribution of the namespace index 415 with respect to containers 440 used to store a region of the namespace index 415.

FIG. 5A illustrates examples of density distribution of a region, and how the locality density metric can be determined from the example density distribution. In the example of FIG. 5A, a first container 440 may store a first portion of a first region, designated R1.1. The first portion R1.1 comprises 30% of the first region. A second container 440 may store a second portion of the first region, designated R1.2. The second portion R1.2 comprises 30% of the first region. A third container 440 may store a third portion of the first region, designated R1.3. The third portion R1.3 comprises 40% of the first region. A fourth container 440 may store a first portion of a second region, designated R2.1. The first portion R2.1 of the second region comprises 80% of the second region. A fifth container 440 may store a second portion of the second region, designated R2.2. The second portion R2.2 of the second region comprises 20% of the second region.

In this example of FIG. 5A, the first region R1 can, ideally, be stored in a single container 440. The second region R2 can also, ideally, be stored in a single container 440. A density locality metric for a region can be given by:

Density of region=Ideal number of containers to store the region divided by the actual number of containers 440 that store the region of the namespace index 415.

The three portions of the first region R1 are R1.1 (30%), R1.2 (30%), and R1.3 (40%). R1.1, R1.2, and R1.3 are each stored in a different container 440. As stated above, the ideal number of containers 440 to store region R1 is one container. Thus the density of region R1 of an example namespace index 415 is:

Density of R1=1 divided by 3=33.33% locality density metric for R1.

In an embodiment, a region of a namespace index can be marked for locality repair if the density for the region is less than a threshold value. In an embodiment, the threshold density locality metric for a region of an MTree can be 60%. Here, region R1 of the namespace index 415 is 33.33%, which is less than 60%, and the region R1 of namespace index 415 can be considered for locality repair.

The two portions of the second region R2 are R2.1 (80%) and R2.2 (20%). R2.1, and R2.2 are each stored in a different container 440. As stated above, the ideal number of containers to store region R2 is one container. Thus the density of region R2 of an example namespace index 415 is:

Density of R2=1 divided by 2=50% locality density metric for R2.

In an embodiment, a region of a namespace index 415 can be marked for locality repair if the density for the region is less than a threshold value. In an embodiment, the threshold density locality metric can be 60%. Here, region R2 of the namespace index 415 is 50%, which is less than 60%, and the region R2 of namespace index 415 can be considered for locality repair.

FIG. 5B illustrates examples of a distribution of a region over a number of containers 440, and how the locality distribution metric can be determined from the example distribution. In an example of FIG. 5B, a first container 440 may store a first portion of a first region, designated R1.1. The first portion R1.1 comprises 30% of the first region. A second container 440 may store a second portion of the first region, designated R1.2. The second portion R1.2 comprises 30% of the first region. The first container 440 also stores a third portion of the first region, designated R1.3. The third portion R1.3 comprises 40% of the first region. A third container 440 may store a first portion of a third region, designated R3.1. The first portion R3.1 of the third region comprises 100% of the third region. A fourth container 440 may store a first portion of a second region, designated R2.1. The first portion R2.1 of the second region comprises 80% of the second region. A fifth container 440 may store a second portion of the second region, designated R2.2. The second portion R2.2 of the second region comprises 20% of the second region.

In this example of FIG. 5B, the first region R1 can, ideally, be stored in a single container 440. The second region R2 can also, ideally, be stored in a single container 440. The third region is stored in a single container 440. A distribution locality metric for a region can be given by:

Distribution of region=Ideal number of containers to store the region divided by the actual number of containers 440 read to enumerate the region of the namespace index 415.

The three portions of the first region R1 are R1.1 (30%), R1.2 (30%), and R1.3 (40%). R1.1 and R1.3 are both stored in a first container 440. R1.2 is stored in a second container 440. To enumerate (traverse, in order) the first region R1 of the namespace index 415, container 1 must first be read, then container 2, then container 1 must be read again, to obtain region portions R1.1, R1.2, and R1.3, respectively. Thus, three containers 440 are read when enumerating region R1 of the namespace index 415, even though only two containers 440 are used to store region R1. As stated above, the ideal number of containers 440 to store region R1 is one container. Thus the distribution of region R1 of an example namespace index 415 is:

Distribution of R1=1 divided by 3=33.33% locality distribution metric for R1.

In an embodiment, a region a namespace index 415 can marked for locality repair if the distribution for the region is less than a threshold value. In an embodiment, the threshold distribution locality metric can be 40%. Here, the locality distribution metric for region R1 of the namespace index 415 is less 33.33%, which is less than 40%, and the region R1 of namespace index 415 can be considered for locality repair.

The two portions of the second region R2 are R2.1 (80%) and R2.2 (20%). R2.1 and R2.2 are each stored in a different container 440. As stated above, the ideal number of containers to store region R2 is one container. Thus the distribution locality metric of region R2 of an example namespace index 415 is:

Distribution of R2=1 divided by 2=50% locality distribution metric for R2.

In an embodiment, a region a namespace index can marked for locality repair if the distribution for the region is less than a threshold value. In an embodiment, the threshold distribution locality metric can be 40%. Here, the locality distribution metric for region R2 of the namespace index 415 is 50%, which is greater than 40%, and the region R2 of namespace index would not be considered for locality repair using the locality distribution metric for region R2.

Region R3 has only one portion, R3.1, and the portion comprises 100% of the region. R3 is stored in only one container 440. The ideal number of containers to store region R3 is one container 440. The actual number of containers 440 read when enumerating the region R3 is one container. Thus the distribution locality metric of region R3 of an example namespace 415 is:

Distribution of R=1 divided by 1=100% locality distribution metric for R3.

In an embodiment, a region a namespace index can marked for locality repair if the distribution for the region is less than a threshold value. In an embodiment, the threshold distribution locality metric can be 40%. Here, locality distribution metric for region R3 of the namespace index 415 is 100%, which is greater than 40%, and the region R3 of namespace index would not be considered for locality repair using the locality distribution metric for region R3.

In an embodiment, a region of a namespace index 415 can be scheduled for locality repair if either the locality density metric for the region is less than a threshold value, or the locality distribution metric for the region is less than a threshold value.

Figure 6:
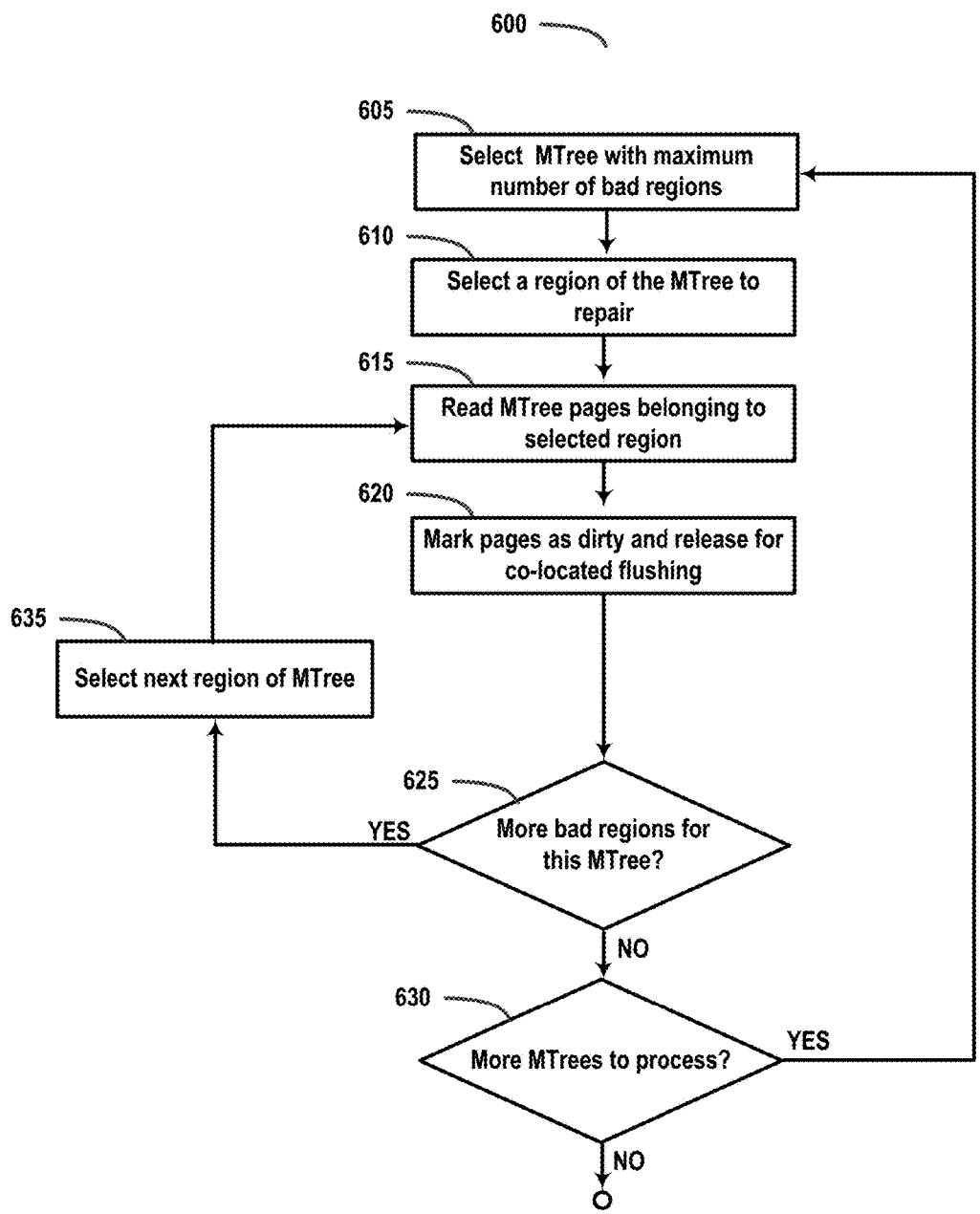
FIG. 6 illustrates, in block diagram form, a method of locality repair of a namespace in a deduplication storage file system, in accordance with some embodiments.

FIG. 6 illustrates, in block diagram form, a method 600 of locality repair of a namespace in a deduplication storage file system, in accordance with some embodiments.

In operation 605, an MTree that stores a namespace index 415 can be selected for namespace index 415 locality repair. An administrator may set criteria for determining "how bad" an MTree locality should be before the MTree is scheduled for locality repair. A balance can be found between performance gain due to defragmented MTree namespace indices and the overhead expended in computing resources to perform locality repair function. For example, when a plurality of namespace indices 415 are first implemented on a storage system, a default size for the namespace index 415 may be allocated from contiguous blocks of memory or storage containers. It may take some time before the namespace grows, through use of the file system, to the point where new pages of memory are allocated and appended to grow the namespace index 415. In an embodiment, a storage system may not preallocate any memory pages for a namespace index 415, and the namespace index 415 may begin growing immediately, with use of the file system. In such a case, a lower threshold for scheduling one or more regions of an MTree for locality repair may be used.

In embodiment, an MTree storing a namespace index 415 may be scheduled for locality repair if a predetermined number of regions, or a threshold percentage of regions of the MTree, have locality metrics that indicate the region needs locality repair. In an embodiment, if three or more regions of an MTree need locality repair, the MTree is scheduled for locality repair. In an embodiment, if more than 25% of the regions of an MTree need locality repair, then the MTree is scheduled for locality repair. Scheduling an MTree for locality repair does not imply that all regions of the MTree will be selected for locality repair. Rather, the regions of the selected MTree that have locality metrics indicating that locality repair of the region is needed will be scheduled for locality repair.

In operation 610, a first region of the selected MTree is selected for repair. In an embodiment, the selected first region is a region of the MTree that has already been determined to need locality repair based upon locality measurement of FIG. 3.

In operation 615, the selected region of the MTree is traversed and the pages of the region are read into memory.

In operation 620, the pages of the region to be repaired are marked as dirty pages and are released for co-located flushing to storage. In an embodiment, the pages of the region are flushed to one or more co-located storage containers 440.

In operation 625, it can be determined whether there are more regions of the selected MTree that need locality repair. If so, then in operation 635 a next region of the MTree that requires locality repair is selected and the method 600 continues at operation 615. Otherwise, at operation 630, it can be determined whether there are more MTrees to process. If so, then the method 600 resumes at operation 605. If there are no more MTrees to process, then method 600 ends.

Figure 7:
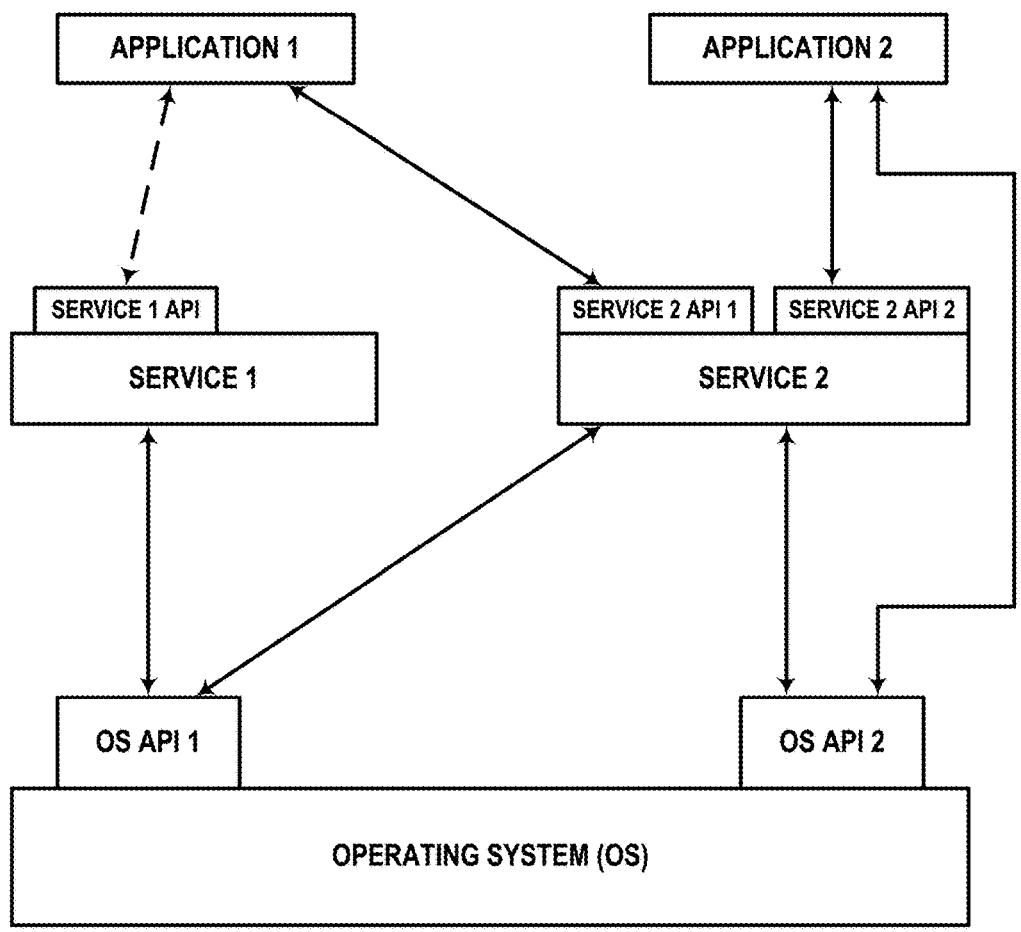
FIG. 7 illustrates an exemplary embodiment of a software stack usable in some embodiments of the invention.

In FIG. 7 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
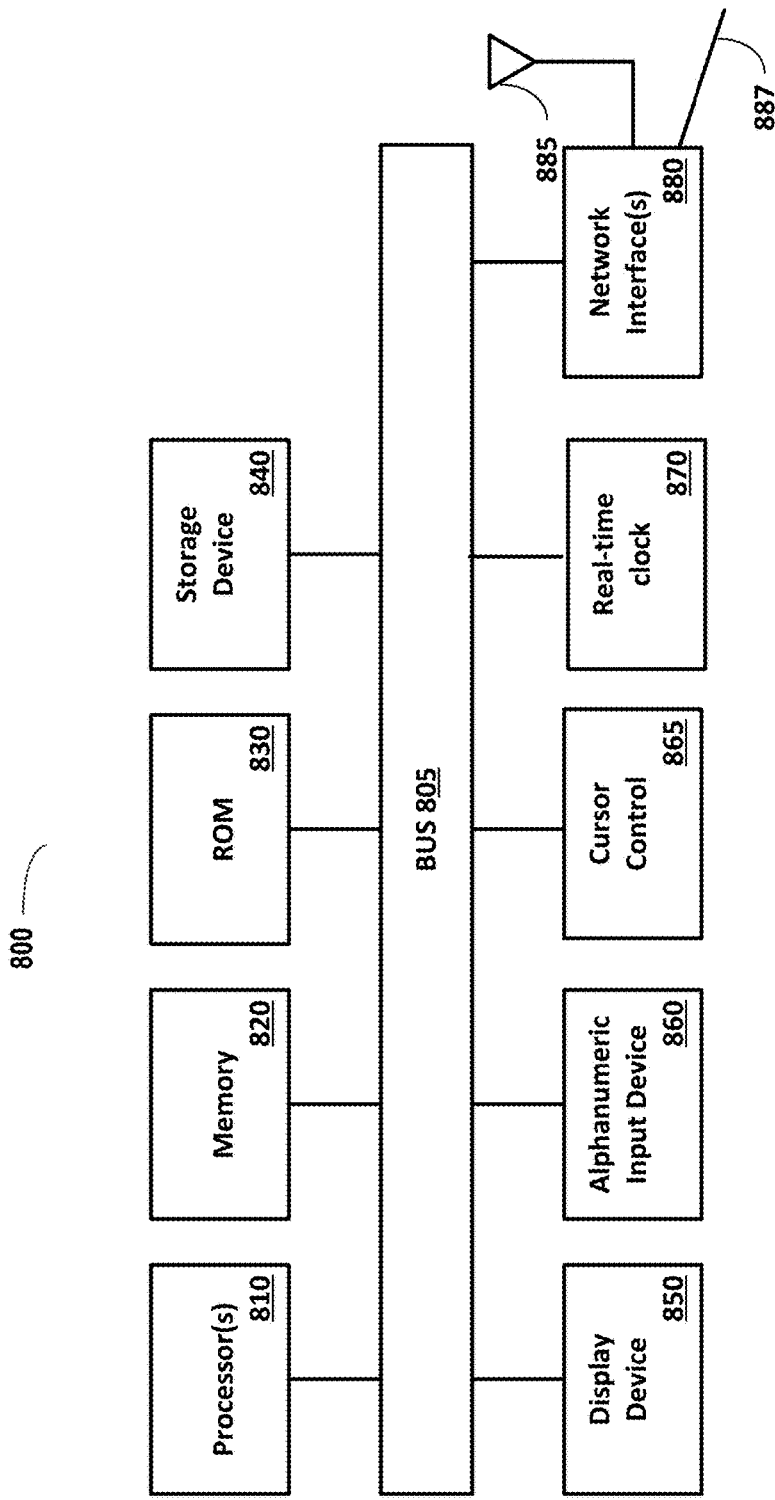
FIG. 8 illustrates, in block diagram form, an exemplary computing system for implementing concepts described herein.

FIG. 8 is a block diagram of one embodiment of a computing system 800. The computing system illustrated in FIG. 8 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 8 may be used to provide a computing device and/or a server device.

Computing system 800 includes bus 805 or other communication device to communicate information, and processor 810 coupled to bus 805 that may process information.

While computing system 800 is illustrated with a single processor, computing system 800 may include multiple processors and/or co-processors 810. Computing system 800 further may include random access memory (RAM) or other dynamic storage device 820 (referred to as main memory), coupled to bus 805 and may store information and instructions that may be executed by processor(s) 810. Main memory 820 may also be used to store temporary variables or other intermediate information during execution of instructions by processor 810.

Computing system 800 may also include read only memory (ROM) 830 and/or other static, non-transitory storage device 840 coupled to bus 805 that may store static information and instructions for processor(s) 810. Data storage device 840 may be coupled to bus 805 to store information and instructions. Data storage device 840 such as flash memory or a magnetic disk or optical disc and corresponding drive may be coupled to computing system 800.

Computing system 800 may also be coupled via bus 805 to display device 850, such as a cathode ray tube (CRT), light-emitting diode display (LED), or liquid crystal display (LCD), to display information to a user. Computing system 800 can also include an alphanumeric input device 860, including alphanumeric and other keys, which may be coupled to bus 805 to communicate information and command selections to processor(s) 810. Another type of user input device is cursor control 865, such as a touchpad, a mouse, a trackball, or cursor direction keys to communicate direction information and command selections to processor(s) 810 and to control cursor movement on display 850. Computing system 800 may further include a real-time clock 870. The real-time clock 870 may be used for generating date/time stamps for data records, computing elapsed time, and other time-keeping functions. A real-time clock 870 can be a battery-backed chipset with a settable date and time. Alternatively, a real-time clock 870 may include logic to retrieve a real-time from a network source such as a server or an Internet server via network interfaces 880, described below.

Computing system 800 further may include one or more network interface(s) 880 to provide access to a network, such as a local area network. Network interface(s) 880 may include, for example, a wireless network interface having antenna 885, which may represent one or more antenna(e). Computing system 800 can include multiple wireless network interfaces such as a combination of WiFi, Bluetooth® and cellular telephony interfaces. Network interface(s) 880 may also include, for example, a wired network interface to communicate with remote devices via network cable 887, which may be, for example, an Ethernet cable, a coaxial cable, a fiber optic cable, a serial cable, or a parallel cable.

In one embodiment, network interface(s) 880 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 880 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method comprising:
   selecting, by a locality repair system comprising at least one hardware processor, a namespace index from a plurality of namespace indices, each namespace index mountable on a storage system;
   traversing the selected namespace index and dividing the namespace index into a plurality of regions, each region stored in one or more storage containers on the storage system;
   for each region of the namespace index:
   generating locality information for the region comprising a plurality of locality metrics, the locality information comprising a density metric determined as an optimal number of storage containers required to store the region of the namespace index divided by the actual number of storage containers in which the region of the namespace index is stored and a distribution metric for the region determined as the optimal number of storage containers required to store the region of the namespace index divided by the number of read operations performed during in-order traversal of the region of the namespace;
   enqueuing the region for locality repair in response to determining that the density metric is less than a first threshold value and the distribution metric is less than a second threshold value and a read/write/seek distance between storage containers of the region of the namespace is greater than a third threshold amount and that the actual number of storage containers comprising the region of the namespace index is greater than a fourth threshold value, wherein locality repair stores the region of the namespace index in the minimum number of storage containers requiring the minimum number of read operations required to traverse the region of the region of the namespace index in-order.

2. The method of claim 1, wherein each namespace index comprises undeduplicated data.

3. The method of claim 1, further comprising:
   enqueuing the region for locality repair in response to determining that at least one storage container of the region contains multiple portions of the namespace index that are not contiguous, and the density metric is greater than the first threshold value.

4. The method of claim 3, wherein the region is enqueued for locality repair in response to determining that the locality density metric for the region is less than 60%.

5. The method of claim 1, wherein the region is enqueued for locality repair in response to determining that the locality distribution metric for the region is less than 40%.

6. A non-transitory computer-readable medium programmed with executable instructions that, when executed by a processing system having at least one hardware processor, perform operations comprising:
   selecting a namespace index from a plurality of namespace indices, each namespace index mountable on a storage system;
   traversing the selected namespace index and dividing the namespace index into a plurality of regions, each region stored in one or more storage containers on the storage system;
   for each region of the namespace index:
   generating locality information for the region comprising a plurality of locality metrics, the locality information comprising a density metric determined as an optimal number of storage containers required to store the region of the namespace index divided by the actual number of storage containers in which the region of the namespace index is stored and a distribution metric for the region determined as the optimal number of storage containers required to store the region of the namespace index divided by the number of read operations performed during in-order traversal of the region of the namespace;

enqueuing the region for locality repair in response to determining that the density metric is less than a first threshold value and the distribution metric is less than a second threshold value and a read/write/seek distance between storage containers of the region of the namespace is greater than a third threshold amount and that the actual number of storage containers comprising the region of the namespace index is greater than a fourth threshold value, wherein locality repair stores the region of the namespace index in the minimum number of storage containers requiring the minimum number of read operations required to traverse the region of the region of the namespace index in-order.

7. The medium of claim 6, wherein each namespace index comprises undeduplicated data.

8. The medium of claim 6, further comprising:
enqueuing the region for locality repair in response to determining that at least one storage container of the region contains multiple portions of the namespace index that are not contiguous, and the density metric is greater than the first threshold value.

9. The medium of claim 8, wherein the region is enqueued for locality repair in response to determining that the locality density metric for the region is less than 60%.

10. The medium of claim 6, wherein the region is enqueued for locality repair in response to determining that the locality distribution metric for the region is less than 40%.

11. A system comprising:
a processing system having at least one hardware processor, the processing system coupled to a memory programmed with executable instructions that, when executed by the processing system, perform operations comprising:
selecting a namespace index from a plurality of namespace indices, each namespace index mountable on a storage system;
traversing the selected namespace index and dividing the namespace index into a plurality of regions, each region stored in one or more storage containers on the storage system;
for each region of the namespace index:
generating locality information for the region comprising a plurality of locality metrics, the locality information comprising a density metric determined as an optimal number of storage containers required to store the region of the namespace index divided by the actual number of storage containers in which the region of the namespace index is stored and a distribution metric for the region determined as the optimal number of storage containers required to store the region of the namespace index divided by the number of read operations performed during in-order traversal of the region of the namespace index;
enqueuing the region for locality repair in response to determining that the density metric is less than a first threshold value and the distribution metric is less than a second threshold value and a read/write/seek distance between storage containers of the region of the namespace is greater than a third threshold amount and that the actual number of storage containers comprising the region of the namespace index is greater than a fourth threshold value, wherein locality repair stores the region of the namespace in the minimum number of storage containers requiring the minimum number of read operations performed during in-order traversal of the region of the namespace.

12. The system of claim 11, wherein each namespace index comprises undeduplicated data.

13. The system of claim 11, further comprising:
enqueuing the region for locality repair in response to determining that at least one storage container of the region contains multiple portions of the namespace index that are not contiguous, and the density metric is greater than the first threshold value.

14. The system of claim 13, wherein the region is enqueued for locality repair in response to determining that the locality density metric for the region is less than 60%.

15. The system of claim 11, wherein the region is enqueued for locality repair in response to determining that the locality distribution metric for the region is less than 40%.

* * * * *